United States Patent [19]
Bedell et al.

[11] Patent Number: 5,680,124
[45] Date of Patent: Oct. 21, 1997

[54] SKEW AND LOSS DETECTION SYSTEM FOR ADJACENT HIGH LIFT DEVICES

[75] Inventors: Jeffrey C. Bedell, Renton; Wayne M. Berta, Kent, both of Wash.

[73] Assignee: The Boeing Company, Seattle, Wash.

[21] Appl. No.: 441,555

[22] Filed: May 15, 1995

[51] Int. Cl.[6] .................................................. G08B 21/00
[52] U.S. Cl. ..................... 340/945; 340/686; 244/213; 244/215; 244/194; 244/195; 324/207.13; 364/424.06
[58] Field of Search ................................ 340/945, 686; 244/213, 214, 215, 1 R, 76 A, 178, 194, 195; 324/207.13; 464/23; 364/424.06

[56] References Cited

U.S. PATENT DOCUMENTS

| | | | |
|---|---|---|---|
| 3,598,999 | 8/1971 | Hofmeister | 244/178 |
| 3,841,589 | 10/1974 | Appleby et al. | 244/178 |
| 3,935,754 | 2/1976 | Comollo | 74/665 F |
| 4,181,276 | 1/1980 | Kogure | 244/215 |
| 4,256,277 | 3/1981 | Embree | 244/213 |
| 4,521,060 | 6/1985 | Linton | 303/71 |
| 4,720,066 | 1/1988 | Renken et al. | 244/213 |
| 4,789,119 | 12/1988 | Bellego et al. | 244/226 |
| 4,904,999 | 2/1990 | Klansnic et al. | 340/945 |

*Primary Examiner*—Jeffery Hofsass
*Assistant Examiner*—Benjamin C. Lee
*Attorney, Agent, or Firm*—Bernard A. Donahue

[57] ABSTRACT

This invention is a method and apparatus for determining whether or not auxiliary airfoils on an aircraft wing are skewed or lost. It employs either of two types of systems and their associated computer monitor and control requirements. One system utilizes a cable and a spring-loaded mechanism with a cable displacement position sensor. The second system utilizes a drive system position sensor, proximity sensors and segmented proximity targets. These two systems are capable of skew and loss detection for adjacent or individual auxiliary airfoil arrangements. A computer electronic unit is used to perform logic functions to verify the authenticity of sensor signals, and, if appropriate, to shut down the drive system and to compute new flight control parameters including those relating to stall speed and the stick shaker, while alerting the flight crew.

3 Claims, 9 Drawing Sheets

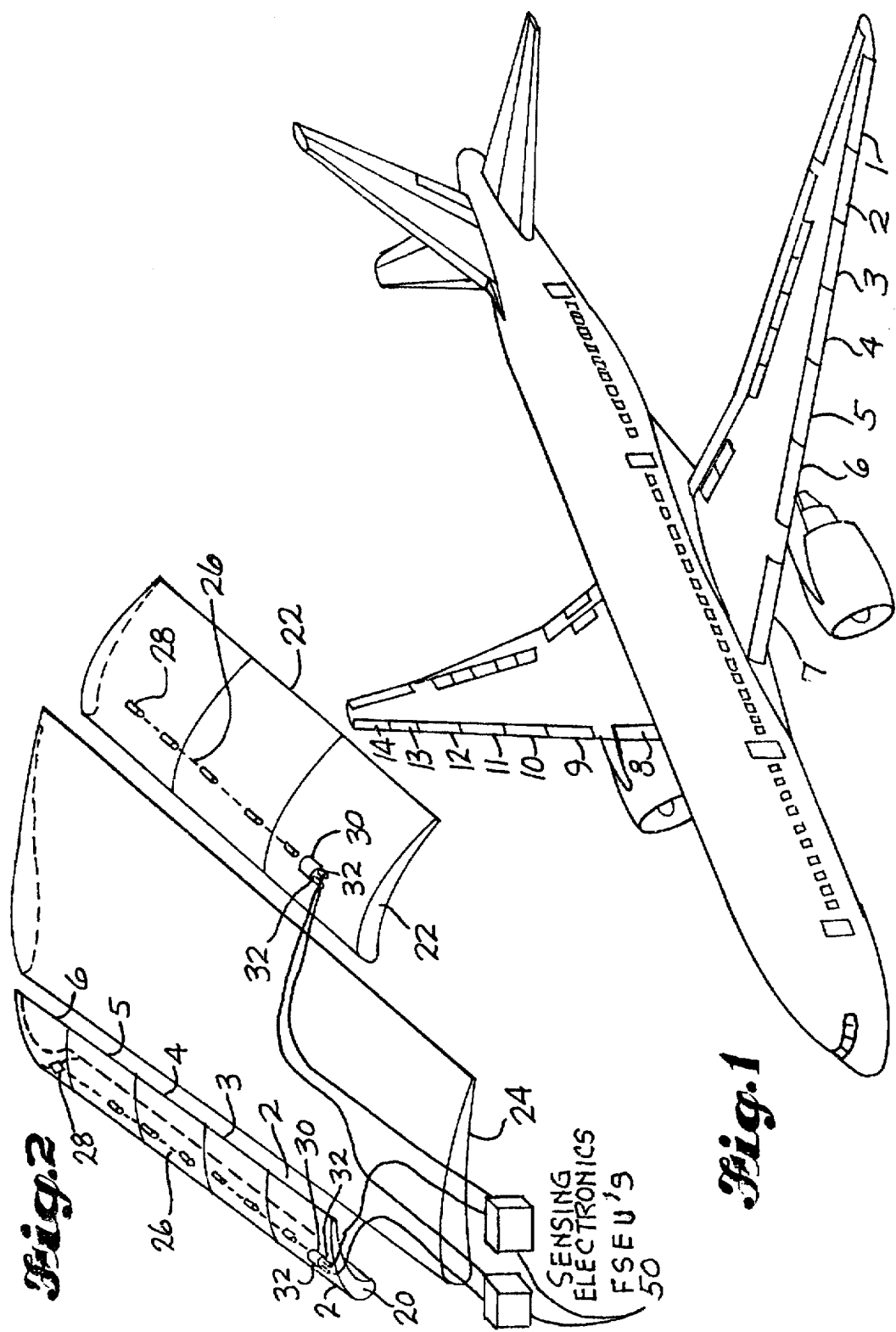

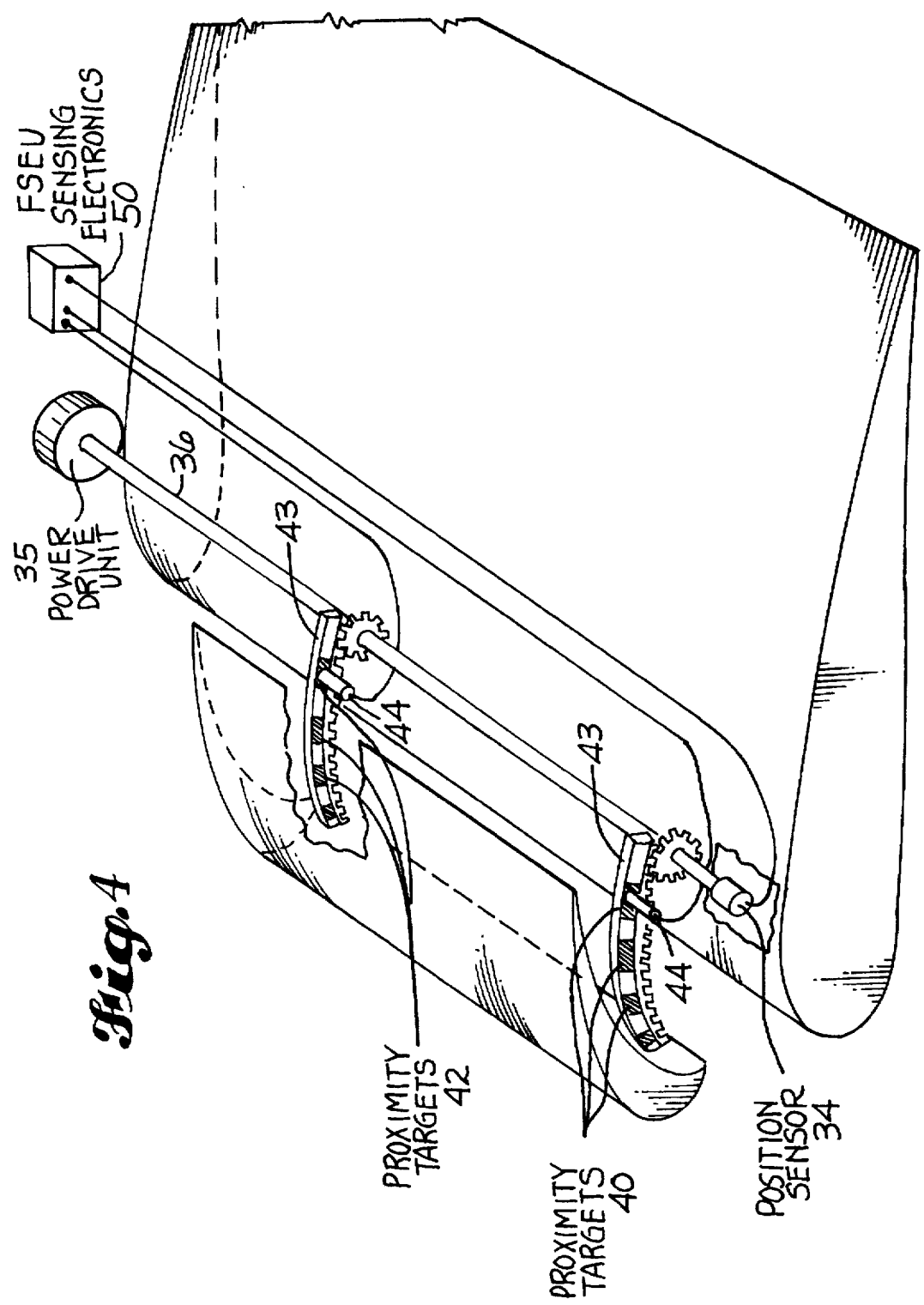

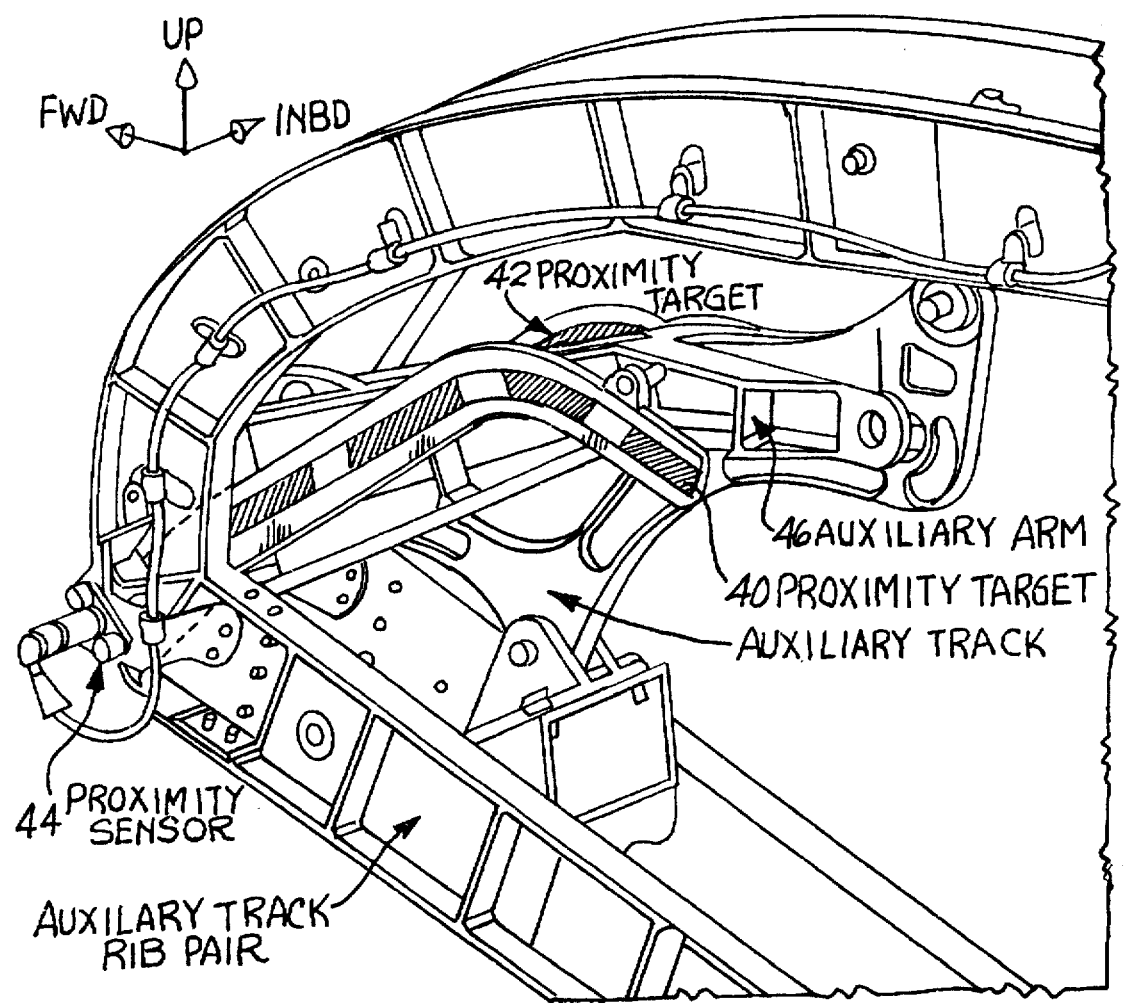

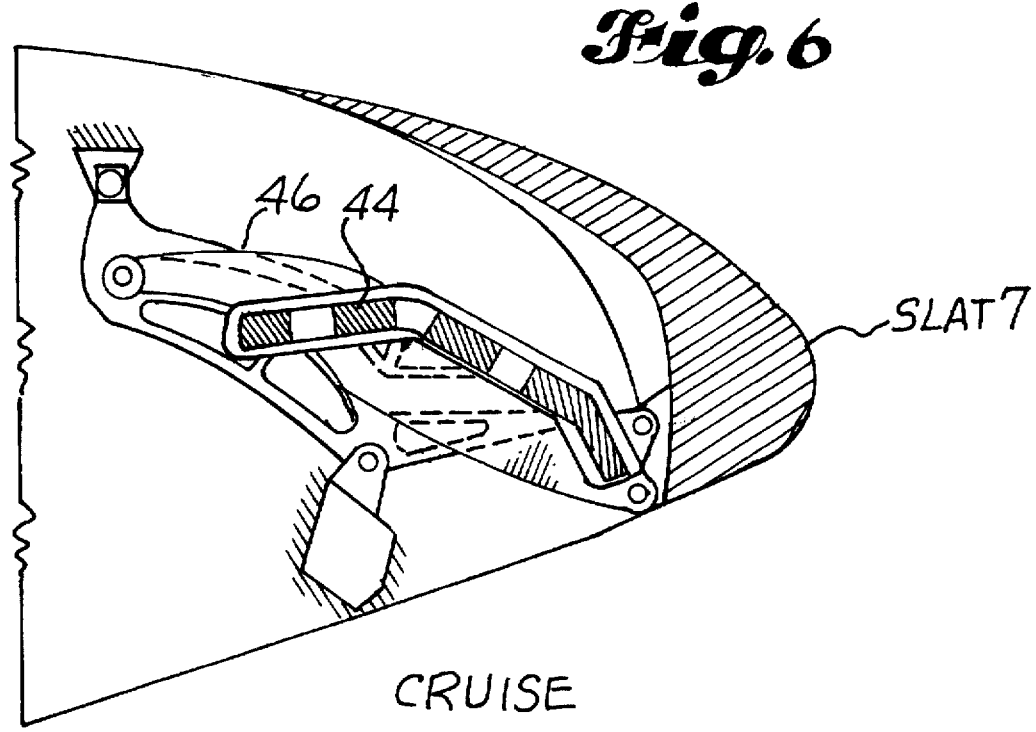
CRUISE
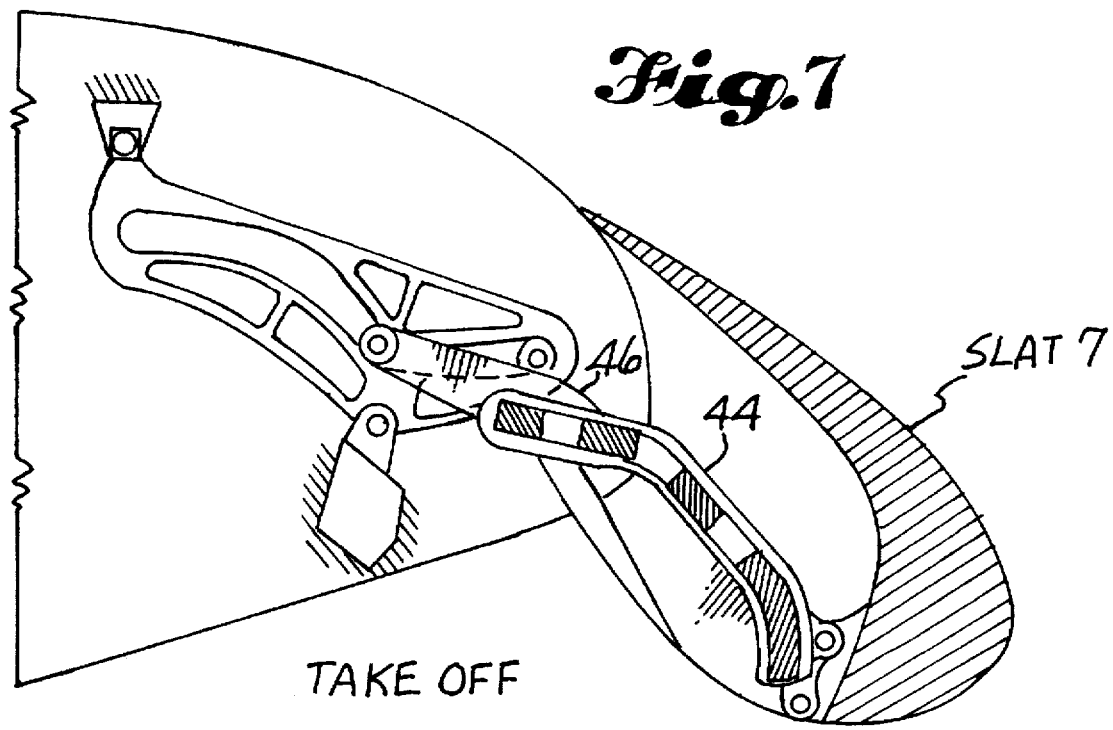
TAKE OFF

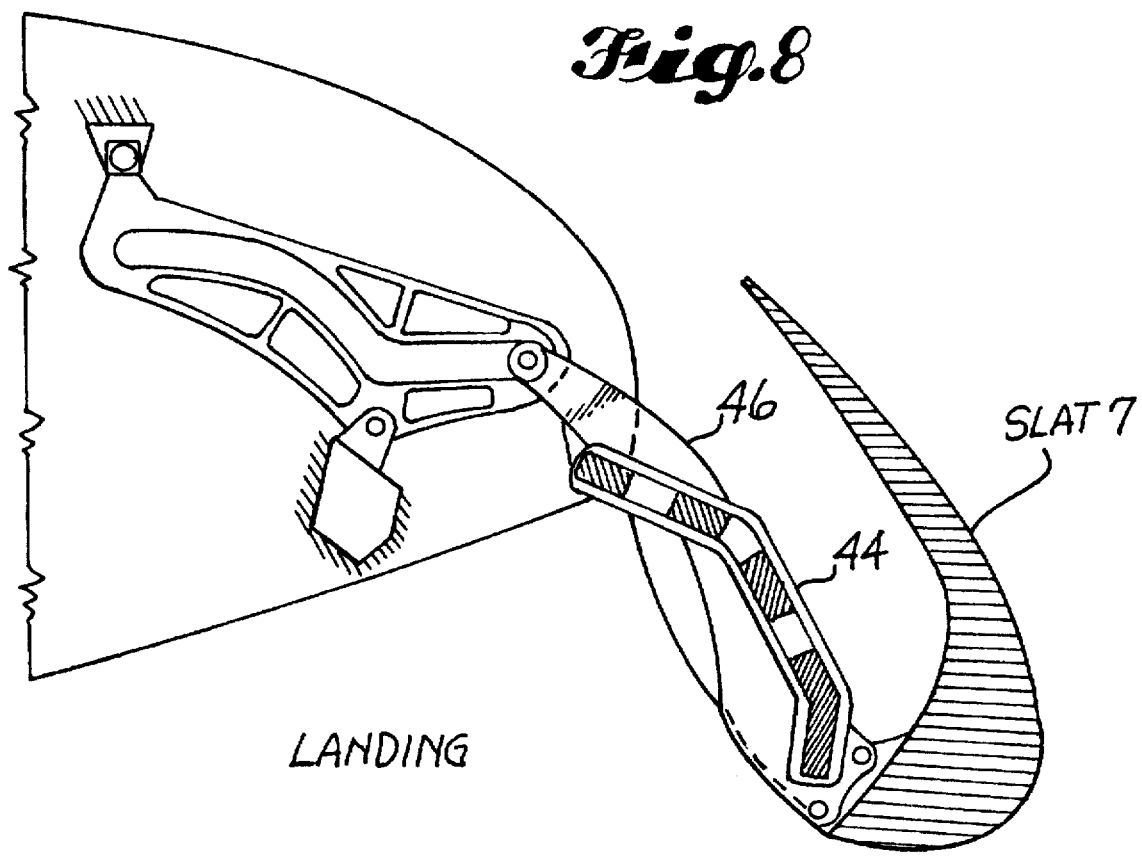

5,680,124

1

SKEW AND LOSS DETECTION SYSTEM FOR ADJACENT HIGH LIFT DEVICES

FIELD OF THE INVENTION

This invention relates to a system and apparatus for detecting and verifying misaligned, skewed, or lost high lift surfaces mounted on an aircraft wing and taking corrective actions.

BACKGROUND OF THE INVENTION

High lift devices for aircraft wings are sometimes referred to as auxiliary airfoils. Such devices or airfoils are extended from the leading or trailing edges of the wing to increase aerodynamic lift during takeoff and landing of the aircraft. When extended from the wing, the high lift devices increase the effective size, curvature, camber and area of the wing, thereby increasing the lift of the wing for slow speed flight. High lift devices extending from the leading edge of the wing are usually known as slats and those extending from the trailing edge of the wing are known as flaps.

Normally, each high lift device is deployed by two separate but coordinated drive mechanisms, one on the inboard side and the other on the outboard side of the high lift device. Should one of these mechanisms be unable to perform its function, a skewing of the high lift device may occur and jamming or loss of the high lift device may result. Accordingly, it is a primary objective of this invention to design a system to accurately detect skewing or loss of high lift devices. A problem in designing such a system is that there will always be the relatively smaller skewing movements caused by normal structural deflections, dynamics of the aircraft and temperature changes that could confuse such a detection system.

It is a further object of this invention to provide an improved detection and actuation device that will accurately detect skewed or lost high lift surfaces, to warn the air crew of degraded aircraft performance, and to shut down the high lift drive system to prevent the possibility of further aircraft damage.

SUMMARY

The apparatus and method of this invention monitors, detects and verifies skewing or loss of aircraft high lift devices as they are being deployed from the aircraft wing. The Invention uses a combination of position sensors and proximity sensors and elongated segmented proximity targets to detect skewing or loss of individual high lift devices. A flap/slat electronics unit (FSEU) computer unit is used to correlate drive system position with high lift device position, perform logic functions to verify the authenticity of sensor signals, and, if appropriate, to shut down the drive system and to compute new flight control parameters including those relating to stall speed and the stick shaker, while alerting the flight crew.

BRIEF DESCRIPTIONS OF THE DRAWINGS

FIG. 1 is an isometric view of a modern commercial passenger airplane showing the location of the high lift or auxiliary air foil surface.

FIG. 2 is an Isometric view of a cable system for monitoring relative motion of slats and flaps.

FIG. 4 is an isometric view showing of a slat carrying segmented proximity targets and a wing with fixed proximity sensors.

FIG. 5 shows the location of elongated and segmented proximity targets on slat auxiliary arms and a proximity sensor on the fixed leading edge of a wing.

FIGS. 6, 7, and 8 show the relative positions of the slat, auxiliary arm and segmented proximity targets to the fixed wing as the slats are extended to take off and landing positions.

Figure 9:
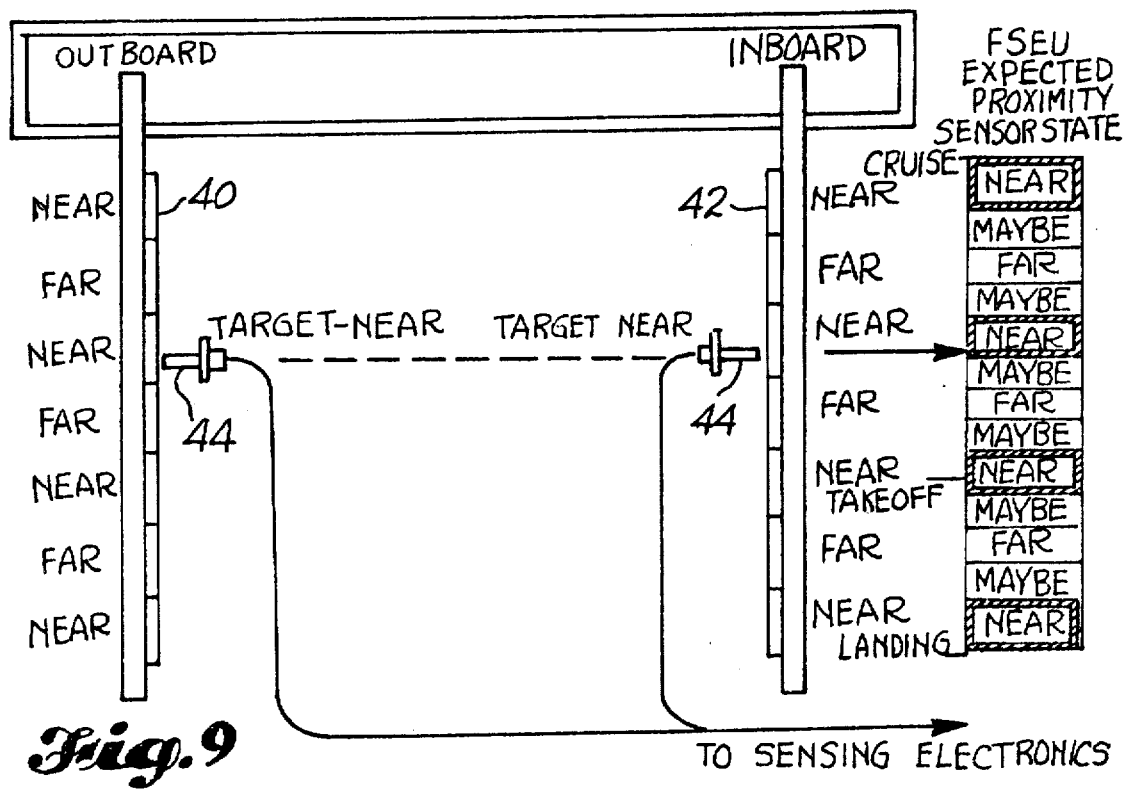
Figure 10:
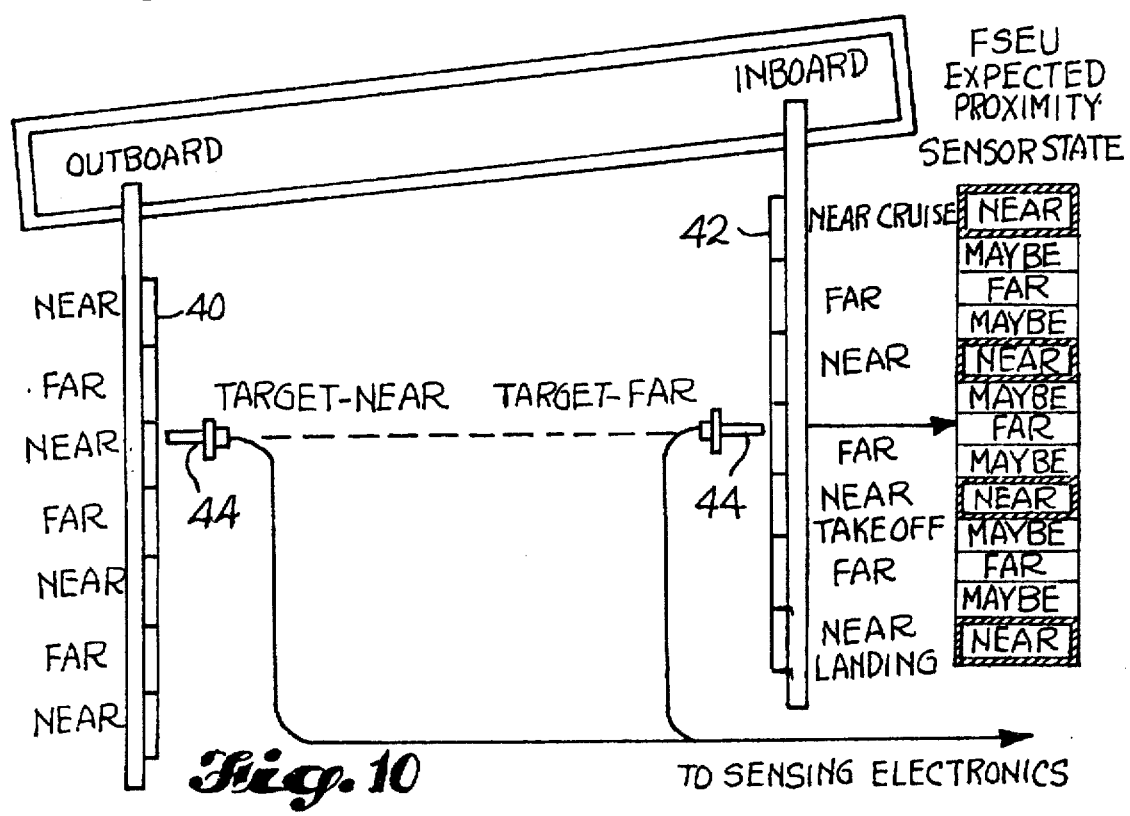

FIGS. 9 and 10 are schematic depictions of actual proximity sensor output and expected proximity sensor output for, respectively, normal and skewed conditions of the slat.

Figure 11:
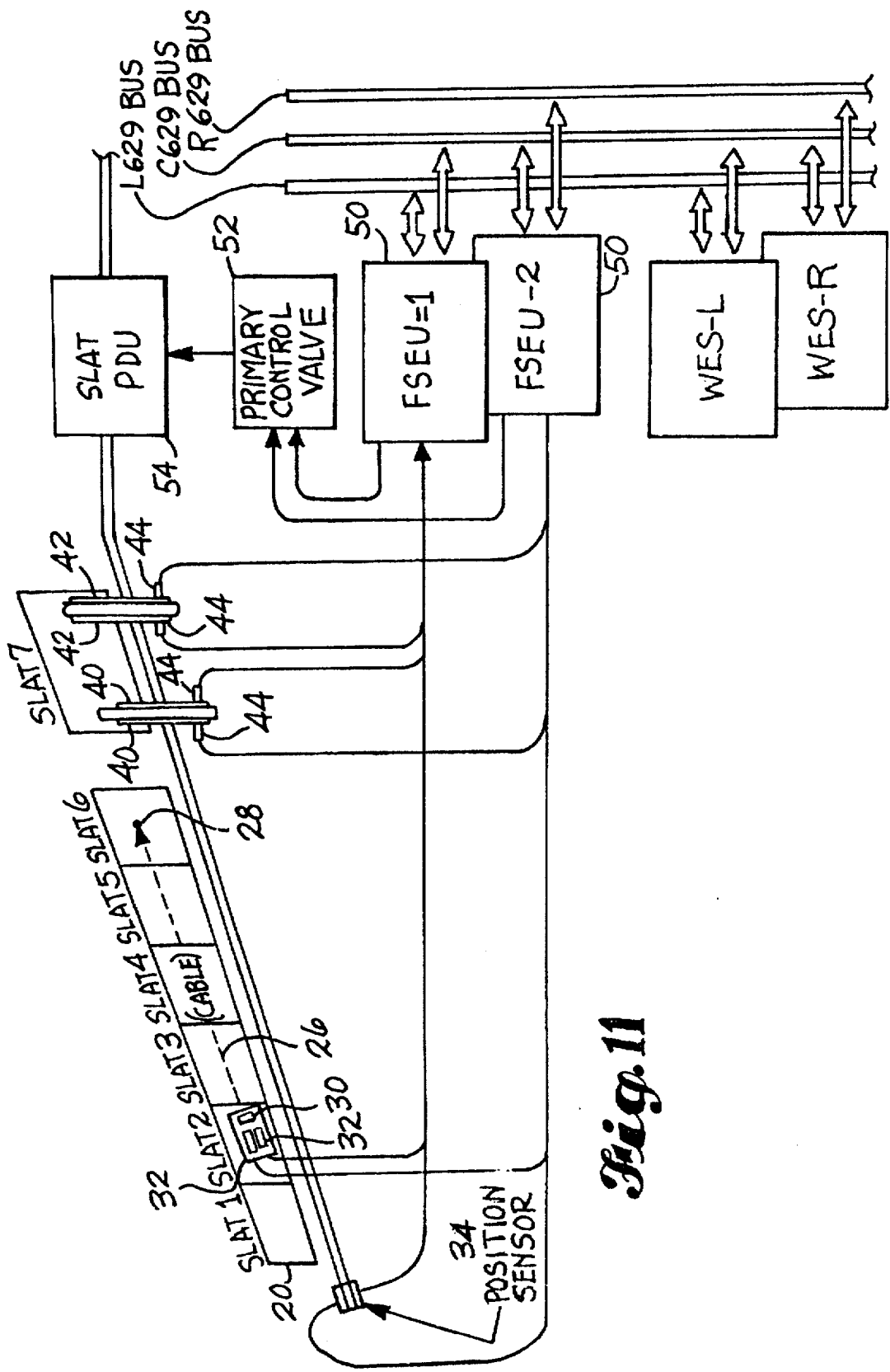

FIG. 11 shows the electronic and computer system used for detecting and verifying skewing in this Invention.

Figure 12:
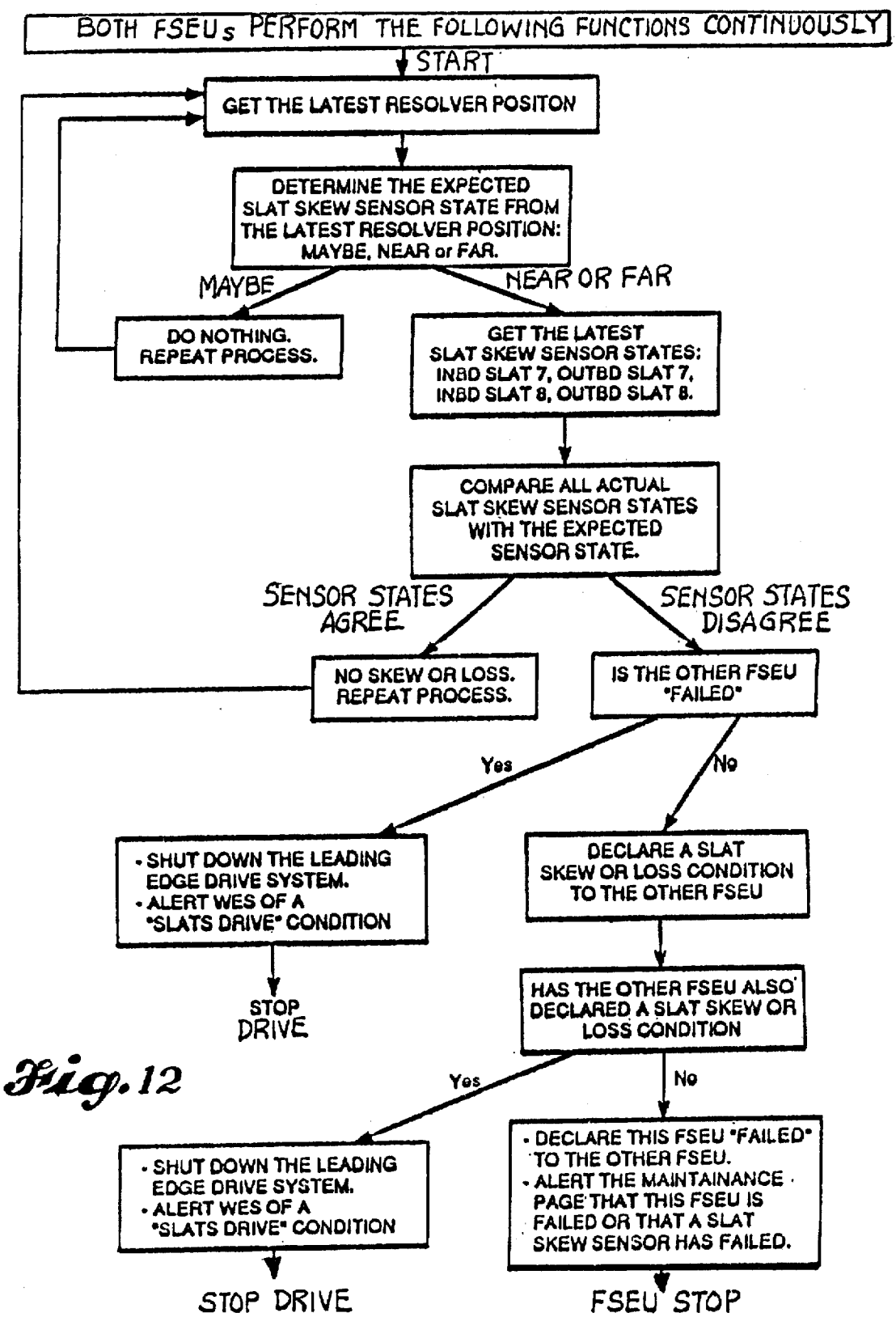

FIG. 12 is a computer logic diagram for the detection verification, and shut down process for the segmented target system used in this invention.

DESCRIPTION OF THE PREFERRED EMBODIMENTS

FIG. 1 is a isometric view of a modern commercial airplane having six outboard slats 1, 2, 3, 4, 5, and 6 on the left of the aircraft wing. The single Inboard slat 7 is located between the left engine and the fuselage of the aircraft. Substantially Identical mirror-image slats are, of course, located on the right wing of the aircraft as shown in FIG. 1 (reference numerals 8 through 14). These slats are the high lift auxiliary air foils located at the leading edge of the wing.

The principles, Improvements, and unique features of this invention apply equally to the flaps shown at the trailing edge of the wing in FIG. 1, but for purposes of conciseness the invention will primarily be described in connection with the slats on the leading edge of the wing.

FIG. 2 schematically depicts slats 20 and flaps 22 extended from a section of wing 24. The system utilizes a cable 26 passing through, or along, each adjacent, independently driven flap or slat surface. These surfaces are driven along similar deployment paths and deployment distances. The cable 26 is anchored at one end 28 and is guided through, or along, each slat by means of cable guides. At the cable end opposite from the anchor 28, a spring mechanism 30 keeps tension on the cable and allows limited cable movement. A sensor 32 is used to monitor the cable movement. A sensor detection threshold or distance is determined which will indicate an out of normal range cable movement. The sensor can be any type of position sensing device (LVDT, proximity, etc.).

A nylon-coated stainless steel cable 26 is anchored on slat 6. The cable is then threaded through mid-slat and end-of-slat guides outboard to slat 2. A spring-loaded mechanism, known as the detection mechanism assembly (DMA), containing a proximity target assembly and two proximity sensors is installed inside of slat 2. The cable is routed into slat 2 by plastic bend guides and attached to the DMA. The same system is also installed on the right wing with the anchor in slat 8 and the DMA in slat 13.

Proximity sensors normally have two defined sensor output ranges, or sensor states. When the face of a proximity sensor is held close to a proximity target, the sensor state is referred to as "target-near". When the face of the proximity sensor is moved away from the proximity target, the sensor state is referred to as "target-far". The terms "activated" and "deactivated" are sometimes used to describe the "target-near" and "target-far" sensor states respectively. The sensor-to-target distance required to produce a "target-near" sensor state is dependent on the detail designs of the sensor and target.

To allow for normal wing bending and temperature expansions and contractions, the DMA is a lost-motion type of device. The lost motion in the DMA allows normal cable movement to occur without substantially altering the proximity sensor-to-target distance. The DMA normally holds the proximity sensors close to the proximity target in a "target-near" sensor state. In the case of a slat skew or slat loss, the cable is displaced and pulls the proximity target away from the proximity sensors a distance greater than the detection threshold This creates a "target-far" sensor state. In the case of a slat loss, or skewing, the cable will pull the target away and continue to pull until a pair of latches on the DMA will engage the target assembly to hold the sensors in a "target-far" sensor state.

As shown in FIG. 2, the electrical wiring for the proximity sensors is routed from slat 2 (slat 13 on the RH-wing) into the fixed wing and the aircraft fuselage. The two proximity sensors in each DMA,are connected to the high lift control system's two flap/slat electronics units (FSEU). One proximity sensor from each DMA is connected to each FSEU. This creates two electrically separate, redundant, monitor systems.

Since in normal operations, both DMA's hold the proximity sensors in "target-near" sensor states, the FSEU's look for "target-far" to indicate a slat skew or slat loss. If both FSEU's agree that their sensors have "target-far" states, a condition of slat skew or slat loss is determined to have occurred. The FSEU's then shut down controlled movement of the slat drive system and alert the Warning Electronics System (WES) that the slats are disabled in their current position. The WES will then reschedule the stall warning alert and stick shaker in accordance with the current slat position and declare a "SLATS DRIVE" message to the flight crew on the cockpit display. In the event that the FSEU's detect that both proximity sensors in the DMA have failed, slat skewing and slat loss is not detectable. As a precaution against undetected slat skew or slat loss, the FSEU's shutdown the leading edge slat drive and alert the WES as if an actual slat skew or loss were detected.

FIG. 2 shows three trailing edge flaps 22 equipped with a cable system, one of the skew or loss detecting embodiments of this invention. For conciseness and ease of description the balance of this description will be confined to the leading edge slat embodiments of this invention because the principles of operation are substantially the same for leading or trailing edge auxiliary airfoils.

The system of FIG. 2 was configured with: a) proximity sensors and targets; b) a lost motion device to hold the proximity targets close to the sensors; and c) electronics which determine skew or loss based on "target-far" indications. The system of FIG. 2 could have been configured with: a) any type of switch with a lost motion device; b) any type of position sensor with or without a lost motion device; and c) electronics which determine skew or loss based on open or closed switches or position sensors which have been displaced beyond a predetermined detection threshold.

Figure 3:
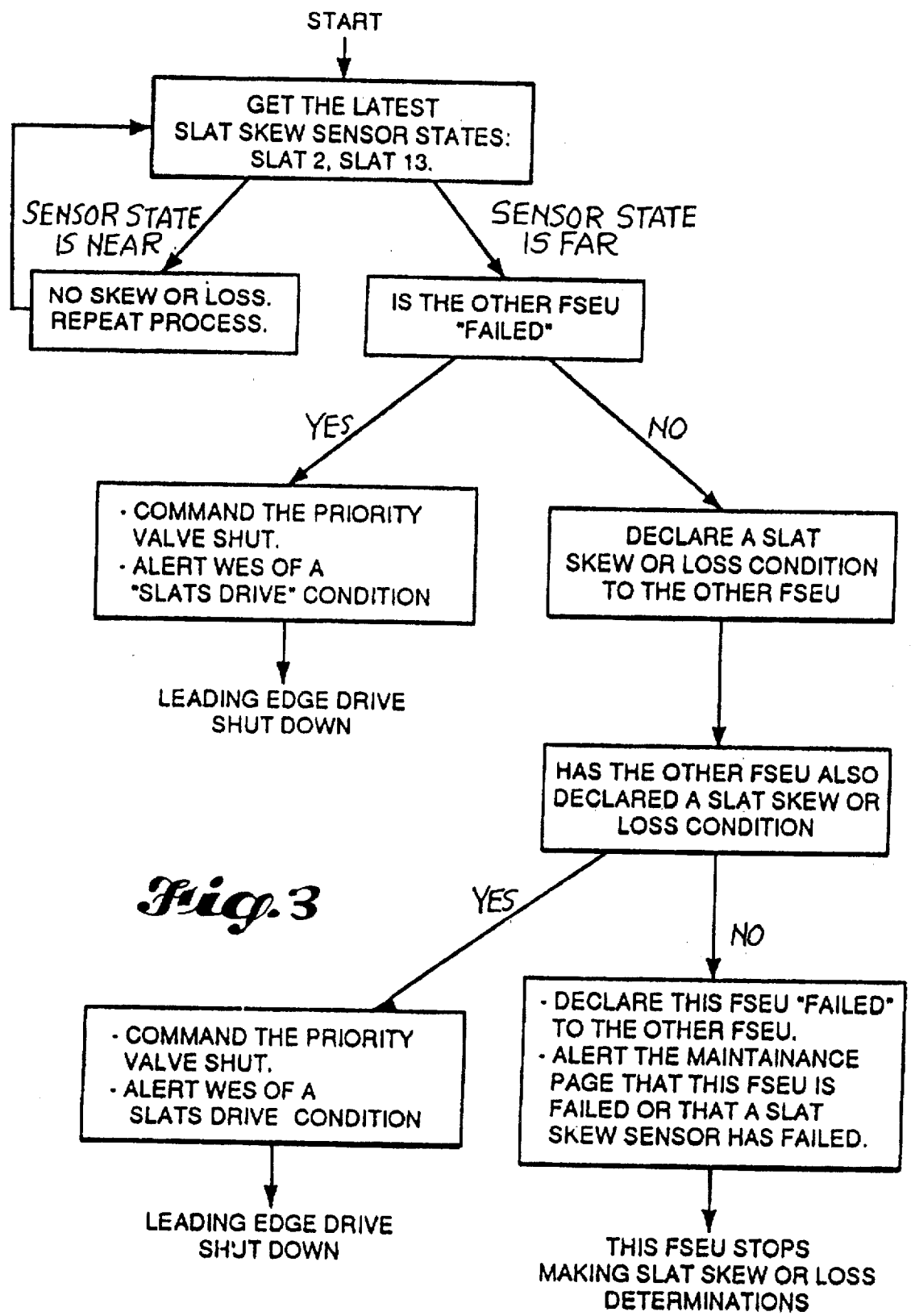
FIG. 3 is a computer logic diagram for the detecting, verification, and shut down process for cable systems used in this invention.

FIG. 3 is a computer logic diagram for some of the detecting, verification, shut down, and crew warning steps of the method of this invention.

Referring to FIG. 4, a resolver or position sensor 34 monitors rotary motion and reports, to the FSEU's, the angular deployment of the slat. The power drive unit 35 transmits rotary power through the torque tubes 36. The segmented and elongated proximity targets 40 and 42 are located on the tracks 43 of the rack and pinion device that deploys and retracts with the slat. Other locations may be just as suitable. In fact, an embodiment that has been tested by applicants has the elongated and segmented proximity target assemblies 40 and 42 located upon the auxiliary arms (not shown in FIG. 4 but will be shown and described in connection with FIGS. 5 through 8) that control the angular position of the slat for various flight conditions. The proximity sensors 44 are affixed to wing structure and directly face the elongated segmented proximity target assemblies 40 and 42. Also, it should be noted that to achieve two electrically separate monitor systems, two more target assemblies 40 and 42, and two more proximity sensors 44 should be installed on the far side of each of the two tracks 43 and wired to a second FSEU.

Referring now to FIG. 5, the inboard slats on the aircraft, slats 7 and 8, are located inboard of the engines and are not adjacent to any of the other leading edge slat assemblies. Both slats are driven in and out with rack and pinion drive systems near the inboard and outboard ends of each slat. The slat angle is rotated, as the slat is driven out, by means of auxiliary arms. The auxiliary arms are attached to the slat at the forward end of the arm and ride in an auxiliary track at the trailing end of the auxiliary arm. The auxiliary track establishes the amount of slat rotation. Each slat has two sets of two auxiliary arms and auxiliary tracks. One set is located near the inboard end, and the other is located near the outboard end of each slat.

The elongated segmented proximity target assemblies 40 or 42 are attached on the inboard and outboard sides of each auxiliary arm (a total of four proximity target assemblies per slat). The central areas of these proximity targets have alternating areas of magnetic material and non-magnetic material, as indicated by the four blackened areas along the length of each proximity target 40 and 42. Proximity sensors 44 respond to the magnetic materials in the proximity targets 40 and 42 with a reduced electrical impedance. The sensing electronics interpret this reduced sensor electrical impedance as "target near". Facing each segmented target 40 or 42, the proximity sensors 44 are mounted on the fixed wing structure, and send a continuous signal as the targets 40 and 42 move past the sensors 44.

The electrical wiring for each proximity sensor 44 is routed along the fixed wing and into the aircraft fuselage. The two proximity sensors 44 at each monitored auxiliary arm are wired to the high lift control system's two flap/slat electronics units (FSEU) 50. One proximity sensor from each auxiliary arm is wired to each FSEU 50. This creates two electrically separate, redundant, monitor systems.

Each proximity target 40 and 42 in this system is an elongated segmented configuration of alternating zones of magnetic and nonmagnetic materials. These target segments create an alternating "target near" and "target far" sensor state when the high lift surface is in motion. All targets are constructed so that all proximity sensors will be in a "target near" or "target far" sensor state at the same time throughout the drive system travel. In normal operations the flap/slat electronic units (FSEU's) 50 use the output from the proximity sensors 44 to determine drive system position and expected sensor states of the slat 7 and 8 proximity sensors. Since the proximity targets 40 and 42 are constructed in a segmented configuration an alternating "target near" and "target far" sensor state is expected as the slats are deployed or retracted. As the slats are deployed from fully retracted to fully deployed, the segmented target assemblies cause the sensor states to alternate in the following order, "target near", "target far", "target near", "target far", "target near", "target far", and "target near".

Due to production tolerances, each proximity sensor 44 is not expected to switch from "target near" to "target far" at the same instant. The FSEU's assume a small transition period will exist where all the sensor states will not agree with each other. In this transition period the sensors can be either "target near" or "target far" without there being an actual slat skew. This transition period exists between each "target near", and "target far" area and is known as the "target maybe" zone. In normal operations, all of the proximity sensors switch state within the "target maybe" zones as the slat assemblies are deployed and retracted.

While the slats are being deployed (or stationary in the cruise, takeoff, or landing positions) and not in a "target maybe" zone, all of the slat 7 proximity sensor states should agree with the expected sensor state (either "target near" or "target far"). If both FSEU's agree that their two sensors disagree with the expected sensor states, a condition of slat skew or slat loss is determined to have occurred. The FSEU's then shut down movement of the slat drive system and alert the warning electronic system (WES) that the slats are disabled in their current position. The WES will then reschedule the stall warning alert and stick shaker in accordance with the current slat position and declare a "SLATS DRIVE" message to the flight crew on the engine indication and crew alerting system (EICAS) display.

In the event the FSEU's detect that both proximity sensors at any of the monitored auxiliary arms have failed, slat skewing and slat loss will not be detectable. As a precaution against undetected slat skew or slat loss, the FSEU's shut down the leading edge slat drive and alert the WES as if an actual slat skew or loss were detected.

FIG. 5 shows the segmented proximity targets 40 and 42 attached to the auxiliary arms with the proximity sensors 44 mounted on the wing structure. Not shown in FIG. 5 is an additional proximity sensor 44 which faces proximity target 42 similar to the way proximity sensor 44 faces proximity target 40.

FIGS. 6, 7, and 8 show the segmented proximity targets 40 and 42 attached to the auxiliary arms 46 in the cruise, takeoff, and landing positions. Also, for ease of illustration, these FIGURES do not attempt to show the second pair of segmented proximity targets 40 and 42 and proximity sensors 44, that are present in all embodiments of this invention for purposes of dual redundancy. In this embodiment the additional targets and sensors would be mounted on the opposite side of the auxiliary arms.

FIGS. 9 and 10 provide schematic depictions of proximity sensor output for, respectively, normal and skewed conditions of the slat. For clarity only the two inner proximity sensors are shown. In preferred embodiments there will be another pair of proximity sensors and segmented targets connected to a second electronics unit (FSEU) for dual redundancy in the computer system.

FIG. 9 depicts schematically, a slat assembly with segmented proximity targets 40 and 42, preferably mounted near the ends of the slat, on either auxiliary arms or main tracks. FIG. 9 also shows a proximity sensor 44 mounted adjacent to each segmented target assembly. These sensors are mounted on fixed wing structure. In the position shown, the proximity sensors are adjacent to "target near" zones in the segmented proximity targets 40 and 42. This results in "target near" indications in the sensing electronics. If the slat has deployed to the position shown in FIG. 9 without any skewing or jamming in the drive system, the sensing electronics will be expecting a "target near" indication from the proximity sensors. The expected "target near" indication was determined by the sensing electronics from the position sensor 34 information. These expected proximity sensor states are shown in the table at the far right of FIG. 9. It can be seen in the table in FIG. 9, that the proximity sensor states will agree with the expected sensor states as the slat moves through its complete range of motion without skewing.

FIG. 10 depicts the same slat assembly as in FIG. 9 except that the outboard drive mechanism has jammed, or some other failure has occurred, resulting in a slat skew condition. This condition is detected because the expected proximity sensor state at this drive system position is "target far", and the proximity sensor state at the failed end of the slat assembly is "target near". This disagreement between the expected proximity sensor state and the actual proximity sensor state is what the sensing electronics is looking for to detect slat skew or loss.

FIG. 11 shows the electrical and computer system of this invention. The resolver or position sensor 34 sends dual redundant signals to the two FSEU's. As shown, a cable system is anchored in slat 6 and provides dual redundant skewing or loss data to the two FSEU's.

FIG. 11 shows the equipment configuration for the left-hand wing of the slat skew/loss detection system. The right-hand wing is similar. In this system the flap/slat electronics units (FSEU's), each monitor their own separate position and proximity sensors. Both FSEU's are capable of moving the slats and shutting down movement of the slats independently. Both FSEU's are also capable of communicating to the WES and to the rest of the aircraft electrical systems across the 629 communication buses. This configuration of 2 complete, separate and independent FSEU's and sensor sets, makes this system a redundant system. Each FSEU is capable of independently monitoring slat position and detecting slat skew or slat loss.

Each FSEU has a proximity sensor 32 in slat 2 for monitoring a proximity target attached to a slat skew/loss cable 26. The cable 26 is installed along the slats from slat 2 to slat 6. Any skewing of the slats 2 through 6 relative to each other, or loss of slat 3 through 6 will cause the cable to pull the proximity target away from the proximity sensor. Loss of slat 2 will result in loss of the slat 2 proximity sensors and the FSEU's 50 will shut down the slat drive system.

Each FSEU has a pair of proximity sensors 44 installed in the fixed wing structure adjacent to slat 7, one sensor mounted adjacent to the slat 7 outboard auxiliary arm, the other mounted adjacent to the inboard auxiliary arm. These proximity sensors monitor segmented proximity targets 40 and 42 which are installed on the outboard and inboard slat 7 auxiliary arms. Each FSEU 50 has a position sensor 34 at the end of the leading edge drive system for monitoring slat position.

In the operation of the slat skew/loss detection system, each FSEU continuously (at least 10 times per second) monitors their separate slat 2 proximity sensor 32, slat 7 proximity sensors 44, and slat position sensors 34.

In the normal, non-skewed or lost condition, each slat 2 proximity sensor 32 is in a "target near" sensor state. In the skewed or lest condition, the slat skew cable has pulled the slat 2 proximity target away from the slat 2 proximity sensors 32 creating a "target far" sensor state in both slat 2 proximity sensors. If either FSEU detects a "target far" sensor state, the FSEU's will compare their proximity sensor states with each other. If both FSEU's have a "target far" sensor state from their slat 2 proximity sensors, the FSEU's will shut down the slat drive system. If one of the FSEU's has detected a "target far" and the other FSEU or slat 2 proximity sensor has failed, the FSEU which has detected a "target far" will shut down the slat drive system. If both FSEU's or both slat 2 proximity sensor 32 has failed, or any combination of FSEU and slat 2 proximity sensor 32 has failed which will not allow the detection of a slat 2 through 6 skew or loss, then the slat drive system is shut down. If an FSEU has detected a "target far", but the other FSEU still detects a "target near", the FSEU which has found a "target far" has probably failed and will declare itself failed and stop calculating slat 2 skew or loss. FIG. 3 is the computer logic diagram for the method of this invention.

In the normal, non-skewed or lost condition, each slat 7 proximity sensor 44 will have sensor states ("target near" or "target far") which will agree with expected proximity sensor states which have been calculated from position sensor 34 data. As the slats are deployed, retracted, or in a stationary position, the FSEU's monitor the position sensor 34 data to determine the slat position. From the slat position information, the expected slat 7 proximity sensor states are calculated. At any slat position all slat 7 proximity sensors 44 are expected to have the same sensor state. As the slat are deployed or retracted, the slat 7 proximity sensors 44 will alternate sensor state from "target near" to "target far". The point at which the slat 7 proximity sensors 44 switch state is based on the proximity sensor's relative position to the magnetic zones in the proximity sensor's adjacent segmented proximity target 40 and 42. The segmented proximity targets 40 and 42 at the inboard and outboard end of slat 7 are designed so that their adjacent slat 7 proximity sensors 44 will switch sensor state simultaneously.

The FSEU's, while monitoring the slat 7 proximity sensor states, will calculate the expected slat 7 proximity sensor states based on the slat position sensor 34 data. As the slats are deployed or retracted, all of the slat 7 proximity sensors cannot be expected to switch sensor state simultaneously. The slat 7 proximity sensors 44 will change state at slightly different points in the slat position due to production and installation tolerances as well as aircraft effects such as wingflex and extreme temperatures. To avoid disagreements between the expected sensor states and the actual sensor states due to the normal variations in sensor switch points, the FSEU's calculate a "target maybe" zone based on position sensor 34 data. The "target maybe" zones are located around each slat 7 proximity sensor switch point. The width of the "target maybe" is determined from the magnitudes of the production and installation tolerances and aircraft effects.

The FSEU's, while monitoring the slat 7 proximity sensor 44 states, will calculate the expected slat 7 proximity sensor states based on the slat position sensor 34 data. The FSEU's then compare the actual slat 7 proximity sensor states with the expected slat 7 proximity sensor states. If either FSEU expects a "target near" or "target far" slat 7 proximity sensor 44 state, but finds a disagreement between the actual slat 7 proximity sensor 44 state and the expected slat 7 proximity sensor state, the FSEU's will compare with each other to see if both FSEU's have found a disagreement. If both FSEU's have a disagreement between actual and expected sensor states, the FSEU's will shut down the slat drive system. If one of the FSEU's or slat 7 proximity sensors 44 has failed, the FSEU which has detected a disagreement will shut down the slat drive system. If both FSEU's or their slat 7 proximity sensors have failed, or any combination of FSEU and slat 7 proximity sensor has failed which will not allow the detection of a slat 7 skew or loss, then the slat drive system is shut down. If an FSEU has detected a disagreement, but the other FSEU has not, the FSEU which has found a disagreement has probably failed and will declare itself failed and stop calculating slat 7 skew or loss. FIG. 12 is the computer logic diagram for the method of this invention.

As has been reviewed previously, the two FSEU's each sample data and make mutual decisions concerning skewing or loss of slats.

While the invention has been described by way of exemplary embodiments, the claims are not limited to the embodiment described herein. Equivalent devices or steps may be substituted for those described, and operate according to the principles of the present invention and fall within the scope of the claims.

What is claimed is:

1. Apparatus for detecting and signaling a skewing or loss of adjacent auxiliary airfoils driven by an auxiliary airfoil power unit, comprising:

a cable;

a cable displacement position sensor;

a compression spring mechanism for keeping tension on said cable;

a computer electronics unit for measuring the output of said cable displacement sensor and if the cable displacement position sensor output exceeds a predetermined amount, alerts the flight crew of a skew or loss condition, shuts down the auxiliary airfoil power unit, and reschedules the aircraft stall warning and stick shaker accordingly;

wherein one end of said cable is attached to a first auxiliary airfoil and the other end of said cable is attached to a second auxiliary airfoil through said displacement position sensor and said spring mechanism such that skewing or loss of adjacent auxiliary airfoils causes displacement of said cable that is sensed by said cable displacement position sensor.

2. Apparatus according to claim 1 wherein the cable displacement position sensor and spring mechanism are capable of a range of motion which will allow normal aircraft flight effects such as wing flex, extreme temperatures, component tolerance variations, misrigging allowables, and normal displacements associated with auxiliary airfoil extensions and retractions plus an additional amount for skew or loss conditions.

3. Apparatus according to claim 1 wherein the computer electronics unit monitors the cable displacement position sensor and detects a skew or loss condition if the output of the cable displacement position sensor exceeds the expected normal allowables.

* * * * *